United States Patent [19]
Hubbard et al.

[11] Patent Number: 5,814,367
[45] Date of Patent: Sep. 29, 1998

[54] BROADBAND INFRARED AND SIGNATURE CONTROL MATERIALS AND METHODS OF PRODUCING THE SAME

[75] Inventors: Ronald N. Hubbard, Rancho Sante Fe; Tu Chau Luong, San Diego, both of Calif.; Bruce H. Schrier, Okinawa, Japan

[73] Assignee: General Atomics, San Diego, Calif.

[21] Appl. No.: 349,957

[22] Filed: Dec. 6, 1994

Related U.S. Application Data

[63] Continuation-in-part of Ser. No. 106,488, Aug. 13, 1993, abandoned.

[51] Int. Cl.[6] .................................................. B05D 5/06
[52] U.S. Cl. ...................... 427/162; 427/164; 427/166; 427/168; 427/212; 427/214; 427/215
[58] Field of Search .................................. 427/162, 164, 427/166, 168, 215, 214, 212

[56] References Cited

U.S. PATENT DOCUMENTS

| | | | |
|---|---|---|---|
| 2,676,117 | 4/1954 | Colbert et al. ........................... 117/71 |
| 3,033,701 | 5/1962 | Wozniak ................................. 359/359 |
| 3,034,924 | 5/1962 | Kraus et al. ........................... 117/106 |
| 3,410,625 | 11/1968 | Edwards ................................ 359/359 |
| 3,697,153 | 10/1972 | Zycha .................................... 359/359 |
| 3,853,386 | 12/1974 | Ritter et al. ........................... 359/359 |
| 3,944,440 | 3/1976 | Franz ...................................... 148/6.3 |
| 3,984,581 | 10/1976 | Dobler et al. ............................ 427/35 |
| 4,057,316 | 11/1977 | Hacman et al. ......................... 359/359 |
| 4,102,768 | 7/1978 | Kearin et al. ......................... 204/192 P |
| 4,145,113 | 3/1979 | Ranninger et al. ..................... 359/588 |
| 4,168,986 | 9/1979 | Venis, Jr. .............................. 106/291 |
| 4,204,942 | 5/1980 | Chahroudi ............................. 204/298 |
| 4,240,696 | 12/1980 | Tracy et al. ........................... 359/359 |
| 4,298,444 | 11/1981 | Chahroudi ............................. 204/192 |
| 4,337,990 | 7/1982 | Fan et al. ................................. 350/1.7 |
| 4,407,685 | 10/1983 | Hankland ............................... 156/212 |
| 4,414,254 | 11/1983 | Iwata et al. ............................... 428/34 |
| 4,434,010 | 2/1984 | Ash ........................................ 106/291 |
| 4,461,532 | 7/1984 | Sato et al. .............................. 359/359 |
| 4,497,700 | 2/1985 | Groth et al. ......................... 204/192 P |
| 4,498,728 | 2/1985 | Thoni et al. ............................ 359/359 |
| 4,602,847 | 7/1986 | Born et al. ............................. 359/359 |
| 4,770,496 | 9/1988 | Mahlein ................................. 359/589 |
| 4,803,110 | 2/1989 | Ahn et al. ................................. 428/137 |
| 4,842,893 | 6/1989 | Yializis et al. ............................. 427/44 |
| 4,851,095 | 7/1989 | Scoby et al. ......................... 204/192.12 |
| 4,854,670 | 8/1989 | Mellor .................................... 359/589 |
| 4,857,161 | 8/1989 | Borel et al. ......................... 204/192.26 |
| 4,921,882 | 5/1990 | Senich ..................................... 522/99 |
| 4,923,585 | 5/1990 | Krauss et al. ....................... 204/298.04 |
| 4,983,001 | 1/1991 | Hagiuda et al. ......................... 359/359 |
| 4,988,424 | 1/1991 | Woodward et al. ............... 204/192.29 |
| 4,997,241 | 3/1991 | Muratomi ................................ 359/589 |
| 5,059,245 | 10/1991 | Phillips et al. ............................. 106/22 |
| 5,223,465 | 6/1993 | Wheatley et al. ....................... 359/359 |
| 5,243,458 | 9/1993 | Hatano et al. .......................... 359/359 |
| 5,383,995 | 1/1995 | Phillips et al. .......................... 156/230 |
| 5,571,624 | 11/1996 | Phillips et al. .......................... 428/403 |

*Primary Examiner*—Timothy Speer
*Attorney, Agent, or Firm*—Juentiner Pyle Lloyd & Piontek

[57] ABSTRACT

Thin multilayer signature control films having a large differential between the indices of refraction of adjoining layers are characterized by the use as the low index layer or layers of a material having a high coefficient of extinction and a very low index of refraction. The enhanced differential between the indices of refraction results in signature control materials which, in one embodiment, may be comprised of just a substrate and a coating and, in another embodiment, may be a supported or unsupported multilayer film comprised of as few as three layers that have performance characteristics equal to or exceeding prior art films comprised of 15–30 layers. Both continuous films and pigmented liquid coating compositions for signature control are provided. Improved pigments for liquid coating compositions are comprised of appropriately coated microspheres and microballoons.

25 Claims, 4 Drawing Sheets

DEPOSITION

BROADBAND INFRARED AND SIGNATURE CONTROL MATERIALS AND METHODS OF PRODUCING THE SAME

This is a continuation-in-part of application Ser. No. 08/106,488 filed on Aug. 13, 1993, now abandoned.

FIELD OF THE INVENTION

The present invention relates to broadband infrared and signature control materials, particularly films and pigmented coatings for reflecting wavebands in the infrared wavelengths of 1–5 and/or 8–12 microns, and improved methods for producing the same.

BACKGROUND

Multilayer thin films and thin film pigmented coatings for use in infrared and visual signature control, as well as solar heat load control (herein referred to generically as "signature control"), are in particular demand.

Such multilayer thin films are conventionally produced by depositing on a substrate, e.g., by vapor deposition or sputter deposition, a plurality of thin alternating layers of at least two optical materials having different indices of refraction and a predetermined differential between their indices of refraction. The larger the differential between the indices the greater the transmission or reflectance characteristic, and the broader the band of transmission or reflectance.

Conventional optical materials have indices of refraction in the order of from about 2 to about 4, which places an inherent limit on the differential between the indices, with a differential of about 2 being considered quite large.

Due to the limitations on the differential, it is necessary, in order to attain the desired degree of transmission or reflectance, i.e., the desired optical density, to build up a great many alternating layers of the two materials, e.g., 15 to 30 or more layers.

The performance of a multilayer optical device is wave band specific. It is controlled by the thicknesses and the number of the respective layers, and is dependent upon the refractive index difference between layers for the magnitude of its effect. If the thickness or the differential is changed, the performance changes. What is effective in the visible wave band may be of no use in the far infrared.

Materials useful in the production of such devices are elements from a small fraction of the periodic table, because most of the elements in the table are unsatisfactory from either performance or feasibility characteristics. Therefore, the same material may earn mention in many disclosures, but in far different contexts. The same materials, produced in different thicknesses and evaluated at other wave bands, may offer special, beneficial and unexpected results.

It is in the context of other domains and unique requirements that the present invention resides.

SUMMARY OF THE INVENTION

An object of the present invention is to provide signature control materials that are not electrically conductive, not reflective in the visible spectrum, and reflective only in particular bands of the infrared, and otherwise transmissive or absorptive in the infrared. Such materials must also be weather resistant and insoluble in fuels and other fluids, including conventional solvents.

Another object of the invention is to provide such materials in particulate form of performance size for use as pigments in coating materials, such as paints.

Yet another object of the invention is to provide methods of producing such materials in an efficient, practical and economical manner.

It is in particular an object of the invention to increase the differential between the indices of refraction of the high and low index materials in a multilayer optical device, thereby to accommodate development of the desired density in a minimum number of alternating layers.

In accordance with the invention, the differential between the high and low index materials is significantly enhanced by utilization as the low index material of a very thin film of a material having a high coefficient of extinction.

Materials having a high coefficient of extinction have a very low index of refraction, usually below 1.0. However, they are classified as complete absorbers beyond 7 microns and are normally regarded as nontransmissive. They have therefore been deemed unsuitable for use in optical filters at wavelengths larger than 7 microns.

In contrast to the prior art, the present invention is predicated on the discovery that if materials having a high coefficient of extinction can be deposited in sufficiently thin film form, e.g., a few microns or less, the extinction is not intolerable, i.e., transmission is adequate.

The present invention therefore provides a significant increase in the refractive index differential between the layers of a multilayer coating by using a very thin layer of a material having a high coefficient of extinction in alternating layer relationship with a conventional optical material having a high index of refraction.

By virtue of the significant increase in the differential between the indices of refraction of the two materials, broadband filters of the desired optical density can now be formed from as few as 3 to 7 thin film layers, in contrast to the 15 to 30 or more layers previously required to achieve comparable reflectance performance.

Moreover, the present invention provides for perturbation of the layer thicknesses from the conventional one-quarter wavelength optical thickness ("QWOT") whereby to develop reflectance harmonics covering specific wavelength bands.

The invention therefore provides significant advantages in the structure and the methods of fabrication of optical filters, particularly signature control and infrared reflective materials.

The invention further provides for the highly advantageous production and harvesting of multilayer coatings in particulate form of sensible or performance size for use, for example, as pigments in liquid coating materials.

In particular, the invention provides a novel method for producing pigment particles for signature control coating compositions characterized by the step of coating dielectric microspheres with selected coating materials having differing indices of refraction.

The invention further resides in the discovery that for certain applications effective signature control may be achieved by application of a single layer of material of high refractive index to a substrate of low refractive index, e.g., a dielectric microsphere or microballoon.

These and other objects and advantages of the invention will become apparent to those of reasonable skill in the art from the following detailed description, as considered in conjunction with the accompanying drawings.

DETAILED DESCRIPTION

Figure 1:
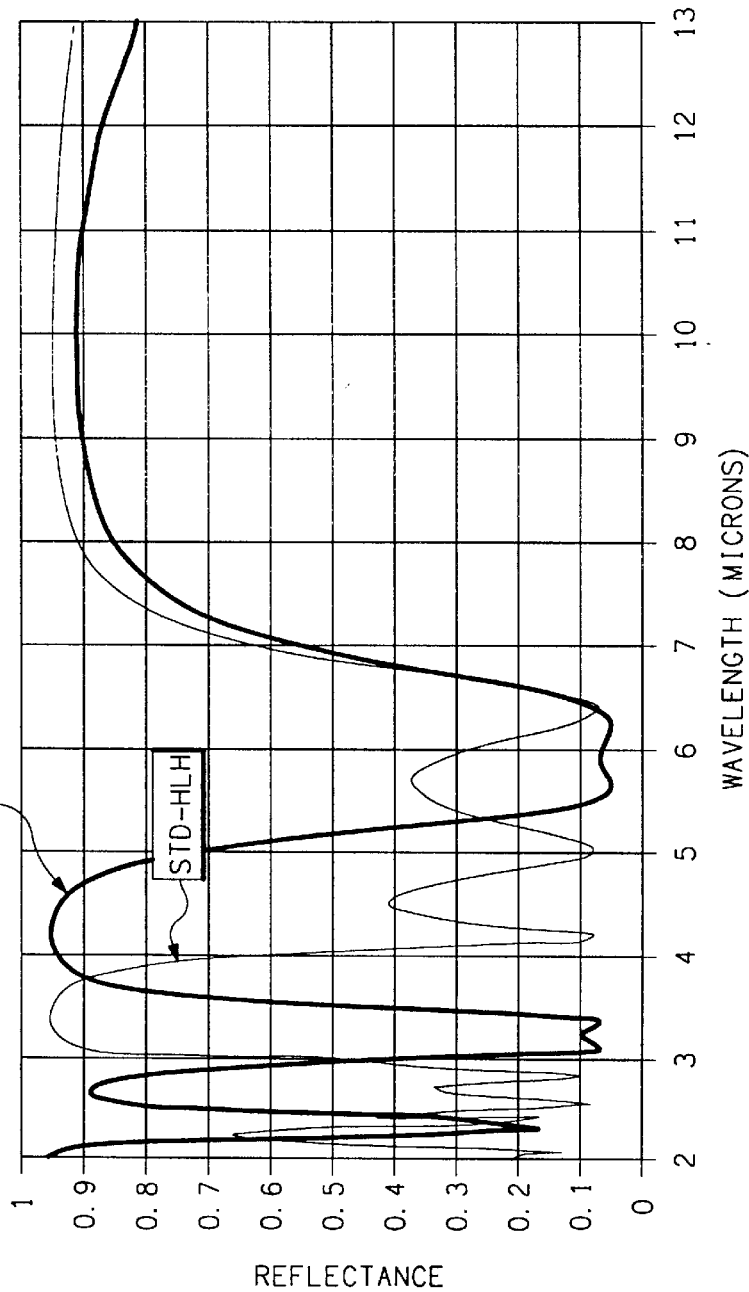
FIG. 1 is a graph plotting the reflectance of a multilayer coating produced in accordance with the invention against the wavelengths within the infrared field of 2 to 13 microns.

The following is a detailed description of the embodiments of the invention presently contemplated by the inventors as the best mode of carrying out their invention.

A particular area of interest for the invention is in modifying the radiation properties of a surface by coating it with a film or a pigmented coating that will modify the spectral emittance of the surface by changing its reflectance and absorptance. A particular desire is to reduce the spectral emittance in some particular bands, while maintaining emittance in other bands. It is desired to do this without significantly changing the conductivity of the surface or its radio frequency (RF) reflectance properties.

One application for such films and pigmented coatings is to reduce or change the emitted infrared (IR) energy of military systems to reduce their susceptibility to IR sensors and/or IR guided weapons.

The specific wave bands to be reflected are primarily in the infrared, which is generally the wavelengths from 1 to 40 microns, and is typically divided up into several sensor bands, i.e., short wave IR at 1–3 microns, midwave IR at 3–5 microns, and long wave IR at 8–12 microns. The region of 5–8 microns is typically of low interest because the atmosphere is strongly absorbing in this region and thus sensors are of little use. In fact, it is desirable to allow the surface to radiate in this band in order to reduce the tendency of the surface to heat up due to a lack of radiation cooling.

More particularly, the invention is directed to the provision of infrared reflective films and/or pigments that are not reflective in the visible spectrum, not electrically conductive, and reflective only in particular bands of the infrared, particularly the infrared wavelengths of 1–5 and/or 8–12 microns. Otherwise, the materials may be transmissive or absorptive in the infrared and in the visible spectrum. The materials should be weather resistant and insoluble in fuels and fluids, including conventional solvents. When intended for use as pigments, i.e., in particulate form, it is also necessary that the materials be producible in relatively large size particles, i.e., a sensible or performance size suitable for attainment of an intended function, e.g., for use as pigments in coating materials.

Films and/or pigments meeting the specified characteristics are usually comprised of alternating layers of a semiconductor having a high index of refraction and a second material having a low index of refraction and providing as great a differential between the indices of refraction as feasible or practicable.

Materials having a high index of refraction are typically semiconductors that are doped enough to be direct current (DC) sputter deposited in a thin film which, due to its thinness, is not significantly conductive. Germanium and silicon have been used extensively because they are widely available, relatively inexpensive and have a high index of refraction. Other semiconductors may be used, such as gallium arsenide and indium antimonide. These materials have a high index of refraction, e.g., 4.0 at 10 microns for germanium. Tellurium, which has a very high refractive index, may also be used, especially in thin film form.

Conventional optical materials having a low index of refraction and deemed suitable for use in the described application have a refractive index no less than about 2.0, which places an inherent limit on the differential between the indices of refraction of the two materials, with a differential of about 2.0 being considered quite large. Consequently, in order to achieve a desired performance standard, i.e., a high level of reflectance, a large number of alternating layers of the two materials are customarily required, e.g., 15 to 30 or more layers.

In accordance with a first aspect of the present invention, the differential between the indices of refraction of the two materials is enhanced by the utilization as the low index material of one or more very thin films of a material having a high coefficient of extinction and normally deemed non-transmissive at the desired wavelengths. It has been discovered pursuant to this invention that if these materials can be deposited in sufficiently thin film form, e.g., a few microns or less, the extinction is not intolerable and transmission is functionally adequate.

The reason for using materials with high extinction is that their index of refraction is very low, usually below 1.0. This results in a large index differential relative to the high index material, which reduces the number of layers required to achieve a specific reflectance. Such enhanced differential simultaneously provides very broad band performance.

Materials which behave in the desired fashion in the infrared include several metal oxides and a variety of polymers. In general, these materials have a coefficient of extinction in the order of about $10^{-3}$ or greater and an index of refraction in the order of about 1.5 or less.

In order to be most effective, metal oxides used in practice of the invention will typically have a coefficient of extinction in the order of about $10^{-2}$, as the index of refraction then drops to below 1.0.

Metal oxides suitable for use in the IR wavelengths include the oxides of aluminum, yttrium, hafnium, silicon, titanium, zirconium, scandium, zinc, magnesium, tantalum, gadolinium, praseodymium, and others. Such metals may also be reacted with gases other than oxygen, such for example as nitrogen. The key point is that, traditionally, the optical handbooks indicate that these materials are not suitable for use in the applications here contemplated because of their high absorption. The present invention has established their suitability and usefulness.

The polymers suitable for use as low index materials in practice of the invention similarly include materials heretofore deemed unsuitable due to their high absorption in the infrared wavebands. However, it has been discovered that if the polymer film is thin enough, a wide variety of polymers having a high coefficient of extinction and a low index of refraction may be utilized successfully. These include polyesters, acrylics, acrylates, polyurethanes, styrenes and vinyl esters, all of which are highly absorbing but practically useful if in sufficiently thin film form. Of particular interest for their high performance characteristics and very low refractive index are certain linearly polymerized polymers.

Linearly polymerized polymers especially well suited for use as low index materials in accordance with the invention, i.e., which are acceptably transparent and not strongly absorbent in both major wavebands here of interest, are the class of styrenics, i.e., polymers of styrene or its analog divinyl benzene. Usually for this application, these polymers would not be deemed sufficiently durable in solvent (fuel) resistance, abrasion resistance, or weatherability. However, it is feasible to create highly cross-linked polymers from styrenic monomers, using minor amounts of other polyfunctional monomers that remain acceptably transparent in the wavebands of interest. The resulting blend can be polymerized by ultraviolet (UV) or electron beam (E-beam) radiation in-line on properly equipped roll to roll web coaters at relatively high speeds, much higher than can be accomplished in vacuuo by reactive sputtering of an oxide.

There are many polyfunctional monomers which will cross link with styrenic monomers or oligomers, while exerting a minimal effect on the absorption in the IR region. One of those found useful is the alpha omega diacrylate of an aliphatic hydrocarbon of 14 to 30 carbons in length, used in a ratio of 1 part diacrylate to 3 to 20 parts divinyl benzene. The oligomer can be polymerized in an electron beam curtain, which is preferred over ultraviolet light because no photo-initiator is required. Photoinitiators tend to absorb strongly in the region of interest. However, if high dose rate UV sources are available, UV can be used with low concentrations of photo initiators such as the ketene type, for example, Ciba-Geigy "KIP" at ½ percent by weight.

Styrene can be substituted for part or all of the divinyl benzene, to obtain a less brittle polymer.

An oligomer obtained by block copolymerization, such as block (polystyrene) (polybutadine), which remains terminated with olefinic groups, can be used in a ratio of one part block oligomer, one part styrene monomer, and one part divinyl benzene. This mixture, in which the styrenics act as a temporary solvent, can be cross linked in an electron beam curtain device at moderate dose rates.

The polymer films of low refractive index useful in practice of the invention may also be formed by applying the respective monomer or oligomer in very thin film form by atomization and electron beam (E-beam) polymerization under vacuum, such as is taught in U.S. Pat. No. 4,842,893. Pursuant to the disclosed technique, the monomer or oligomer is deposited onto the substrate under vacuum by vapor or spray deposition, and then cross linked (polymerized) and rendered insoluble by passage, still under vacuum, through an E-beam curing system. Reasons of thin film formation, production speed, cleanliness and economics make this alternative desirable.

The thicknesses of the optical layers in the multilayer thin films of the invention are determined as a function of the particular application and the perceived threat or sensor wavelength of operation. The optical thicknesses are typically one-fourth of a wavelength, i.e., a quarter wave optical thickness ("QWOT"), as it is known that a stack of alternating layers of low index and high index materials will produce a reflection peak at the wavelength corresponding to a thickness of one-fourth of a wavelength. As an example, consider a three layer stack of germanium/aluminum oxide/germanium. The index of refraction (n) for germanium at a wavelength of 10 microns is 4.0; for alumina it is 0.8. The physical thickness t equals wavelength/4*n. Thus the layer thicknesses are: $t(Ge)=10/4*4=0.625$ microns; $t(Al_2O_3)=10/4*0.8=3.125$ microns. For films at a 1 micron wavelength, the thicknesses would be a factor of ten thinner. Thus, the range of thicknesses for metal oxides typically would be 0.5 to 5.0 microns.

The thickness of the polymers would be similarly determined. As an example, polystyrene has an index of approximately 1.6 at 10 microns. This would result in a physical thickness of $10/4*1.6=1.56$ microns.

Not all film designs have to use quarter wave optical thicknesses; in fact, the present invention provides a technique that does not use QWOTs, but rather perturbs the thicknesses to generate desirable harmonics. FIG. 1 shows that a QWOT designed three layer film (labeled Std-HLH, i.e., standard high-low-high) designed at 10 microns generates a third harmonic at 10/3=3.33 microns. It would be desirable to generate this harmonic to cover the 3.5–5 micron band as this is one of the other wavelength bands of high interest. By changing the thicknesses so as to maintain the main reflection peak at the long wave IR band, but also generate a harmonic that is shifted to cover the mid-wave IR band, the design in terms of QWOTs is changed from the standard $1Ge/1Al_2O_3/1Ge$ to $1.22Ge/0.3Al_2O_3/1.22Ge$. In FIG. 1 this is illustrated and labeled as "Harmonics". In essence, the second band is covered for free.

There is no general formula for the perturbation of layer thicknesses technique, as it is dependent on the particular index and extinction at a particular wavelength. A general description of the design philosophy and the design iteration process is as follows:

The spectral reflectance curve one obtains for a particular high/low index stack is basically the fourier transform of the optical thickness profile of the index vs. thickness. For a square wave function where each layer is a QWOT, the first maximum will be at the fundamental design frequency, with the first major harmonic at three times the frequency of the fundamental (⅓ the wavelength). For a QWOT designed to reflect 10 microns, the major harmonic is at 3.33 microns. Since this harmonic would desirably be centered at about 4.2 microns, the design wavelength could be shifted to 12.6 microns. However, this shifts the fundamental band out to 12.6 microns, resulting in a loss of performance in the long wave IR band. It has been discovered that the high index material is the primary factor in determining where the harmonics fall, whereas the low index material thickness can be changed (made thinner) to compensate for the change in the thickness (made thicker) of the high index material. By iterating small changes in the thicknesses of both materials, an optimal design is arrived at that moves the harmonic to the desired wavelength without seriously affecting the fundamental. Thus the design rule is to use the high index material to position the harmonic and use the low index material to compensate for the change in the high index material, then optimize by successive iterations. In this way a second band can be covered without additional layers and at no additional cost.

In contrast, any standard QWOT design approach, even utilizing the increased refractive index differential advantages of the present invention, would require at least four additional layers to cover a second band; one additional layer for isolation and three additional layers for the second band.

The perturbation technique provided by the present invention produces major cost advantages in two ways: (1) only three layers are required to do what would otherwise take seven layers, and (2) as shown in the example given above, the aluminum oxide layer is three times thinner than would otherwise be required. This is of significant economic importance because the deposition rate of aluminum oxide is three times slower than the deposition rate of germanium. Thus, in terms of total deposition time, the improved three layer film of the invention can be deposited nearly three times faster than a conventional seven layer film.

One example of the production by sputter deposition in accordance with the invention of a three layer film comprised of a semi-conductive metal having a high index of refraction, e.g., germanium, and a metal oxide having a high coefficient of extinction and a low index of refraction, e.g., aluminum oxide, is as follows:

The substrate employed is a roll of flexible web material, typically 1–3 mils thick, typically polyethylene terephthalate (PET) (tradename Mylar), 12–60 inches wide by several hundred feet long.

The substrate is loaded into a DC sputtering chamber and threaded around tension rollers past the sputtering cathodes, e.g., one or more germanium cathodes and one or more aluminum cathodes, and attached to a wind-up roll. The chamber is closed and pumped down to a vacuum level of $1 \times 10^{-6}$ torr. Argon gas is bled in to raise the pressure to 1–10 millitorr. The voltage on the germanium cathode is slowly raised to 300–400 volts to establish stable sputtering conditions at a power level of 2.5 kw. The drive system is activated to transport the web past the germanium cathode at 0.15 ft/min. The whole roll is coated with germanium. The germanium cathode is turned off. The voltage on the aluminum target is slowly brought up to stable conditions at a power level of 4 kw and oxygen is bled in at the substrate to a preestablished level that provides sufficient oxygen to completely oxidize the aluminum being sputtered, but not so much as to oxidize the aluminum target. The web transport drives the substrate past the aluminum cathode at a speed of 0.05 feet per minute until the whole roll is coated with alumina. The germanium sputtering process is then repeated such that the roll of substrate has a three layer coating pursuant to the invention.

An example of the production of a three layer film using a linearly polymerized polymer as the material of low refractive index is as follows:

Using the sputter deposition method above described, a layer of germanium approximately 0.7 microns thick is sputter deposited onto a roll of 3 mil. thick polyester substrate. The roll of coated substrate is removed from the sputtering chamber and the metallized surface of the same is precision roll coated with a liquid dispersion of polystyrene which is dried to form a polystyrene layer 0.5 microns thick. The roll is then returned to the sputtering chamber and another approximately 0.7 micron thick layer of germanium is sputter deposited over the polystyrene.

Both methods result in the economical production of broad band filter films fulfilling the objectives of the invention. Relative to the use of polymers as the low index material, further economies in production may be realized by continuous processing under vacuum wherein the metal is sputter or vapor deposited onto the substrate and the polymer material, in monomer or oligomer form, is atomized onto the metallized substrate and E beam polymerized, in vacuuo, as suggested by U.S. Pat. No. 4,842,893.

A particular objective of the present invention is to provide broad band infrared reflective signature control pigment particles for use in liquid coating compositions, e.g., sprayable paints, for the protective or signature coating of objects that cannot readily or practicably be covered with continuous films, for example, land, air, sea and space vehicles.

In accordance with this aspect of the invention, it is desired, first, to facilitate removal of the multilayer thin film coating from the substrate, and second, to facilitate harvesting of the coating with a high yield of particulates of a size optimally suited for use as pigments in coating materials. Generally, particulate pigments for paint should have a performance size of 5–500 microns, and preferably 100 microns or more. Particles smaller than this are not usable and become waste.

Figure 4:
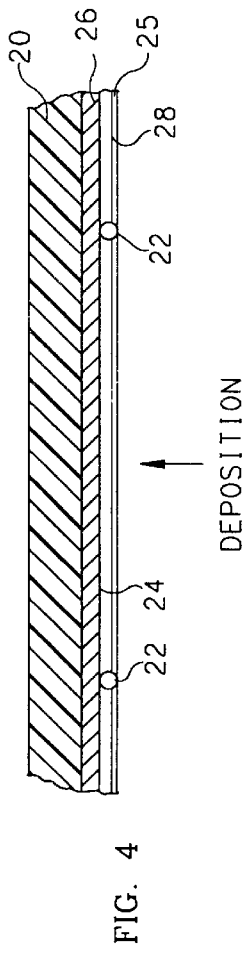
FIG. 4 is a fragmentary cross-sectional view, on a greatly magnified scale, of a substrate like that illustrated in FIG. 2 wherein the grid is formed and the recesses defined by a separable mesh or screen; the view further depicting a method of using the substrate and screen for the production of multilayer coatings of particulate form and predetermined size.
Figure 2:
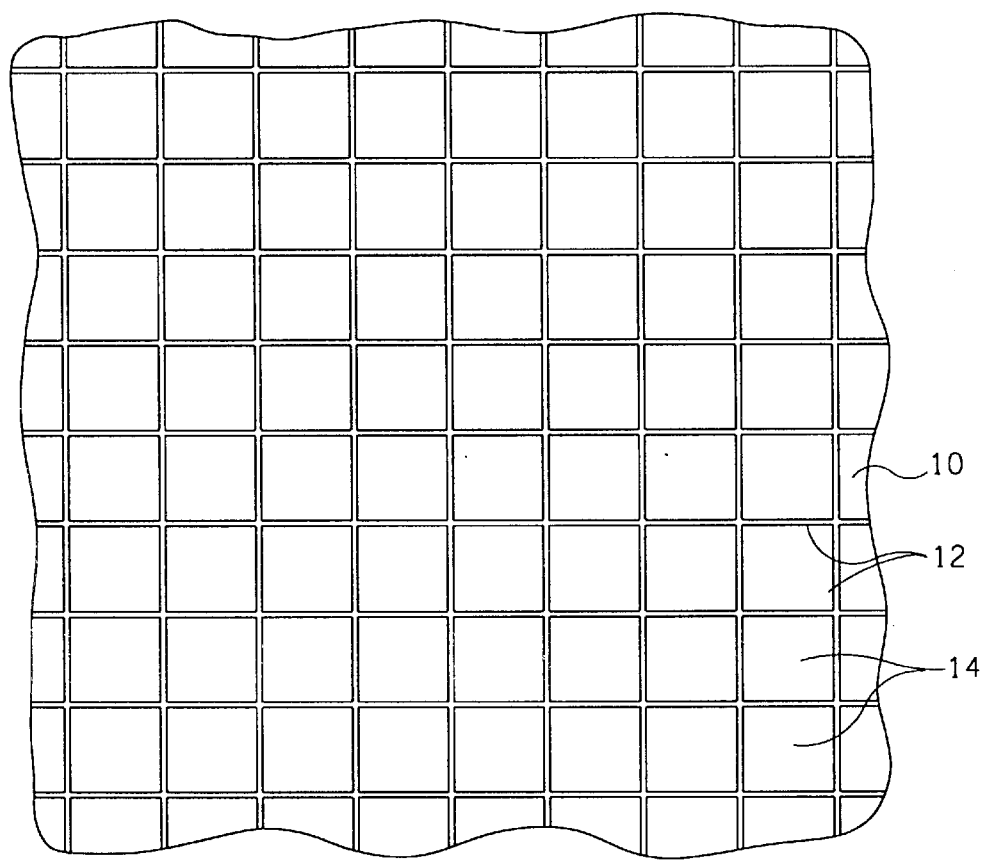
FIG. 2 is a fragmentary plan view of the lower deposition receiving surface of a substrate having thereon a grid of protruding ridges defining a plurality of recesses of preselected size and shape and used for the production of multilayer coatings in particulate form of predetermined size and shape.
Figure 3:
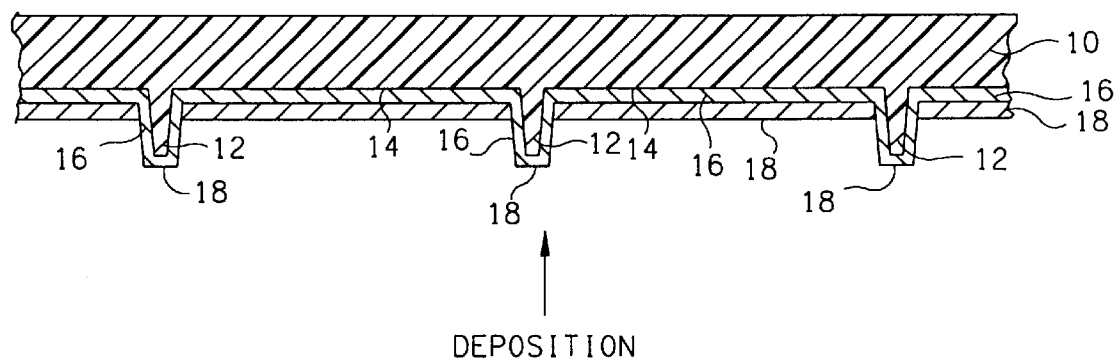
FIG. 3 is a fragmentary cross-sectional view, on a greatly magnified scale, of a substrate like that illustrated in FIG. 2 wherein the grid is formed by embossing the substrate with a waffle iron pattern; the view further depicting a method of using the substrate for producing multilayer coatings in particulate form.

In order to produce and harvest thin film multilayer particles of the desired size at a high level of yield, the present invention provides the method of multilayer film formation illustrated diagrammatically in FIGS. 2, 3 and 4.

As illustrated in FIG. 2, the lower, deposition receiving surface of a substrate 10 is provided with a grid of protruding ridges 12 which define a plurality of individual recesses 14 for reception of the coatings to be deposited thereon. The recesses may be of any preselected size and configuration as is desired for the pigment particles to be produced. In the illustrated embodiment, the recesses are square.

The method of the invention involves first applying to the ridged surface of the substrate 10 and into the recesses 14 a coating 16 of a release agent, preferably a release agent that is soluble in water or some other common solvent; and then, depositing in sequence onto the release coated substrate, i.e., into the recesses 14, the several layers of a preferred multilayer thin film coating 18 as above described. In as much as sputter deposition and monomer atomization take place more or less linearly, little if any of the coating materials is deposited on the ridges 12. Most of the material passes into and is deposited on the flat, release coated, horizontal surfaces defining the bottoms of the recesses 14.

The substrate is suitably a three mil thick flexible web. The release agent 16 may suitably comprise a thin film of soap, polyvinyl alcohol, polystyrene, or other soluble release agent.

After the multilayer film 18 has been deposited on the substrate, the substrate is run through a solvent or water bath, thereby dissolving the release agent 16 and releasing the thin film multilayer coating 18 from the substrate. Upon removal of the signature control film from the substrate, the film fractures along the lines of weakness defined by the ridges 12 into presized particles, all of substantially the same size and shape as the recesses 14, and with a high yield. The pigment flakes are then collected by filtration of the solvent liquid and washed to remove any residual release material, whereupon the pigment flakes are available for use in liquid coating compositions.

Two different modes of practicing the method of the invention are illustrated diagrammatically and on a greatly magnified scale in FIGS. 3 and 4. In the embodiment illustrated in FIG. 3, the ridged substrate 10 is formed by embossing the substrate with a waffle iron pattern thereby to form depressions constituting the recesses 14 and a grid of thin protruding ribs constituting the ridges 12, all in an integral substrate structure.

The release agent 16 is coated onto the ridged surface of the substrate in any suitable manner, e.g., by spraying. The multilayer thin film coating 18 is then deposited on the release coated substrate. Because the side surfaces of the ridges 12 have very little horizontal extent, very little if any of the control film coating 18 will adhere to the side surfaces, whereby the side surfaces of the ridges define lines of separation in the applied coating thereby facilitating release from the recesses 14 of discrete pigment particles of predetermined size and shape and at a high yield.

In the embodiment of FIG. 4, the substrate 20 is a conventional flat surfaced film and ridges 22 and recesses 24 are defined thereon by means of a foraminous template 25, such as a fine mesh screen, which is engaged with the surface of the substrate. Preferably, a coating 26 of a soluble release agent is first applied to the substrate 20, and the template 25 is then pressed against the coated substrate. Alternatively, both the substrate and the template may be coated with the soluble release agent. A multilayer thin film control coating 28 is then deposited on the substrate and the template. In order to withstand the heat generated during sputter deposition, the screen 25 is preferably formed of fine, e.g., 1 mil thick, filaments of stainless steel or fiberglass. Following deposition, the coated substrate is run through a solvent bath whereupon the thin film coating fractures along the lines of demarcation defined by the filaments of the screen into pigment particles of preselected size and shape, and at a high yield.

The invention therefore provides for the convenient, economical and practical production of signature control materials, in the form either of a continuous, substrate supported, signature control film or unsupported particulate pigments for use in coating compositions.

Figure 5:
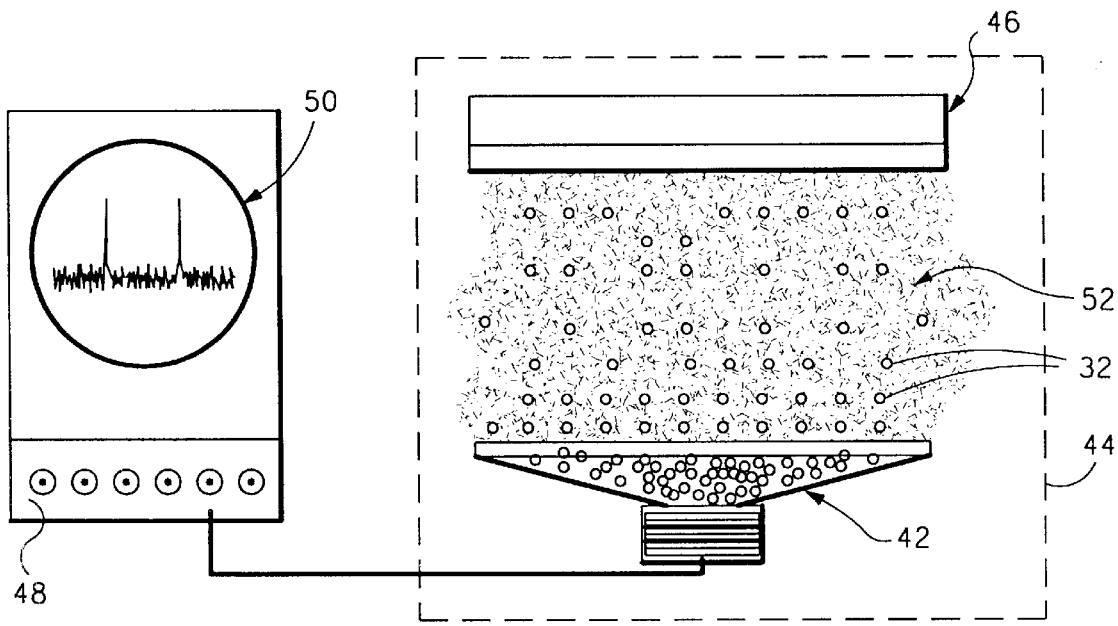
FIG. 5 is a schematic illustration of a preferred method for coating dielectric microspheres to produce pigment particles for use in practice of the invention.
Figure 6:
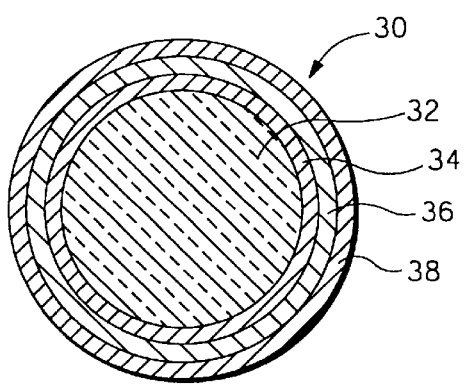
FIG. 6 is a cross-sectional view, on a greatly magnified scale, of a coated microsphere bearing a multilayer coating pursuant to the invention.

An alternative method for producing particulate pigments for use in coating materials is illustrated schematically in FIG. 5, and the resultant pigment particle is shown in cross section on a magnified scale in FIG. 6. As shown in FIG. 6, a highly practical pigment particle, indicated at 30, may be comprised of a spherical substrate or core 32 bearing a first coating 34 of high refractive index, a second coating 36 of low refractive index and a third coating 38 of high refractive index. The core 32 is preferably a microsphere formed of insulating material, which may be either solid of hollow. Microspheres and microballoons suitable for the purpose, made of glass, a polymer or some other dielectric, are available from various sources in a size range of 5 to 100 microns. The coatings 34 and 38 may comprise any of the high refractive index materials above discussed, and the coating 36 may be formed of any of the low refractive index materials above described, all applied within the respective ranges of thickness previously described.

The three layers of coating materials may be applied to the dielectric core in any manner conventional for the respective coating material, e.g., by fluidized bed coating techniques, liquid film coating techniques, vapor or sputter deposition techniques, and the monomer atomization/polymerization technique. By way of example, an apparatus for applying all three coatings by sputter deposition is illustrated schematically in FIG. 5, wherein coating is accomplished by levitation of a quantity of microspheres within a bell jar sputtering system having a magnetron sputtering cathode mounted in the top for downward sputtering onto the levitated spheres. The spheres may be levitated by acoustical levitation or by the well-known fluidized bed technique. In the illustrated apparatus, acoustic levitation is employed.

Referring to FIG. 5, microspheres 32, preferably glass microballoons, are placed in an upwardly directed acoustic levitator 42, such as an acoustic speaker, e.g., a woofer, which is mounted in the lower regions of a vacuum sputtering chamber, indicated schematically by the dotted line 44. A planar magnetron sputtering cathode 46 is mounted in the upper regions of the chamber for downward sputtering of coatings onto the levitated spheres. An electrical driver for the levitator, indicated at 48, is equipped with an oscilloscope 50 which provides a visual read-out of the driving forces. As illustrated on the scope 50 in FIG. 5, the driving forces comprise a steady low frequency tone and an intermittent acoustic pulse. The steady low frequency tone is utilized to levitate and vibrate the spheres in the form of a cloud 52 between the levitator and the sputtering cathode. The sides of the levitator (speaker) are sloped downward to lead to the center so that the spheres will roll to the center then be bounced up and out in a pulsating cloud. The intermittent acoustic pulse is employed to cause a periodic jump in the cloud of spheres. Consequently, sufficient agitation and movement is imparted to the spheres to insure uniform coating of the entire surface of the spheres by the downwardly sputtered coating materials.

The spheres 32 are suitably coated in a three stage operation. In the first stage, a target of a selected material of high refractive index, e.g., germanium, is mounted on the lower surface of the cathode 46 and sputtering is carried out in the conventional manner to deposit on each of the spheres a uniform overall layer 34 of the high refractive index material. In the second stage, a target of a selected material of low refractive index, e.g., a metal oxide, is mounted on the lower surface of the cathode and sputtered in the conventional manner to deposit on each of the high index coated spheres a uniform overall layer 36 of low refractive index that substantially completely encapsulates the high index layer 34. Then, in the third stage, a target of a selected material of high refractive index is mounted on the lower surface of the cathode and sputtered to deposit onto the levitated spheres a uniform overall layer 38 of high refractive index that substantially completely encapsulates the low index layer 36.

The third layer 38 may but need not be the same as the first layer 34. Also, in the second stage, the target material may itself be a metal oxide, or a metal, e.g., aluminum, may be reactively sputtered in the presence of an oxygen partial pressure to form the metal oxide, e.g., $Al_2O_3$.

The three stage coating process may be carried out sequentially in a single apparatus, as illustrated in FIG. 5, or three such apparatuses may be employed for applying respective ones of the three coating materials. When using a material of low refractive index that cannot be sputter deposited, e.g., a polymer, the second stage will be performed separately from the first and third stages, as will be apparent from the preceding description of the application of the coatings to planar substrates. In any event, the spheres are effectively and efficiently coated with the selected materials.

In use, the coated microspheres and/or the multilayer film particulates of the invention are dispersed at a proper concentration in an appropriate film forming binder, as is conventional in the coating materials art, to provide a coating material which, when applied to an object, will impart to the object the desired infrared and/or signature control characteristics. The size of the pigment particles and the concentration of the particles in the binder must of course be sufficient to reflect IR energy. The size of the particles should fall within the range of 5 to 500 microns, and typical concentrations will be in the range of 50–70% by volume. The liquid carrier or film forming binder is IR transparent and may be polystyrene or a polyurethane.

As above described, the preferred film structure will usually consist of three layers. However, when desired to provide enhanced performance characteristics, additional layers may be deposited to build up films comprised of 5 or 7 layers, or even more alternating layers of the high and low index materials.

Figure 7:
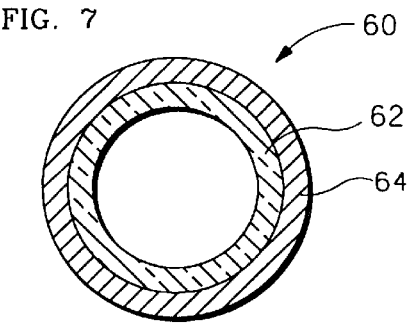
FIG. 7 is a cross-sectional view, on a greatly magnified scale, of a coated microsphere bearing a single layer coating in accordance with the invention.

On the other hand, where high performance characteristics are not absolutely essential, and a lower standard of performance can be tolerated, the present invention has established that a single layer interference coating of a material of high refractive index applied to a substrate of low refractive index can provide adequate signature control for certain purposes. For example, as shown in FIG. 7, a signature control pigment particle 60 may be comprised of just a dielectric microsphere 62 of glass or a polymer, either hollow or solid, and a single layer 64 of a material of high refractive index selected from the materials previously identified. Glass and certain polymers, e.g., PET, have a refractive index in the order of about 1.5, and thus provide a reasonably large differential between a substrate and a high index coating. Also, from an optical analysis viewpoint, a single layer stack, i.e., a low index substrate with a high index coating, provides a three layer effect, i.e., air, high index thin film, and low index substrate.

Figure 8:
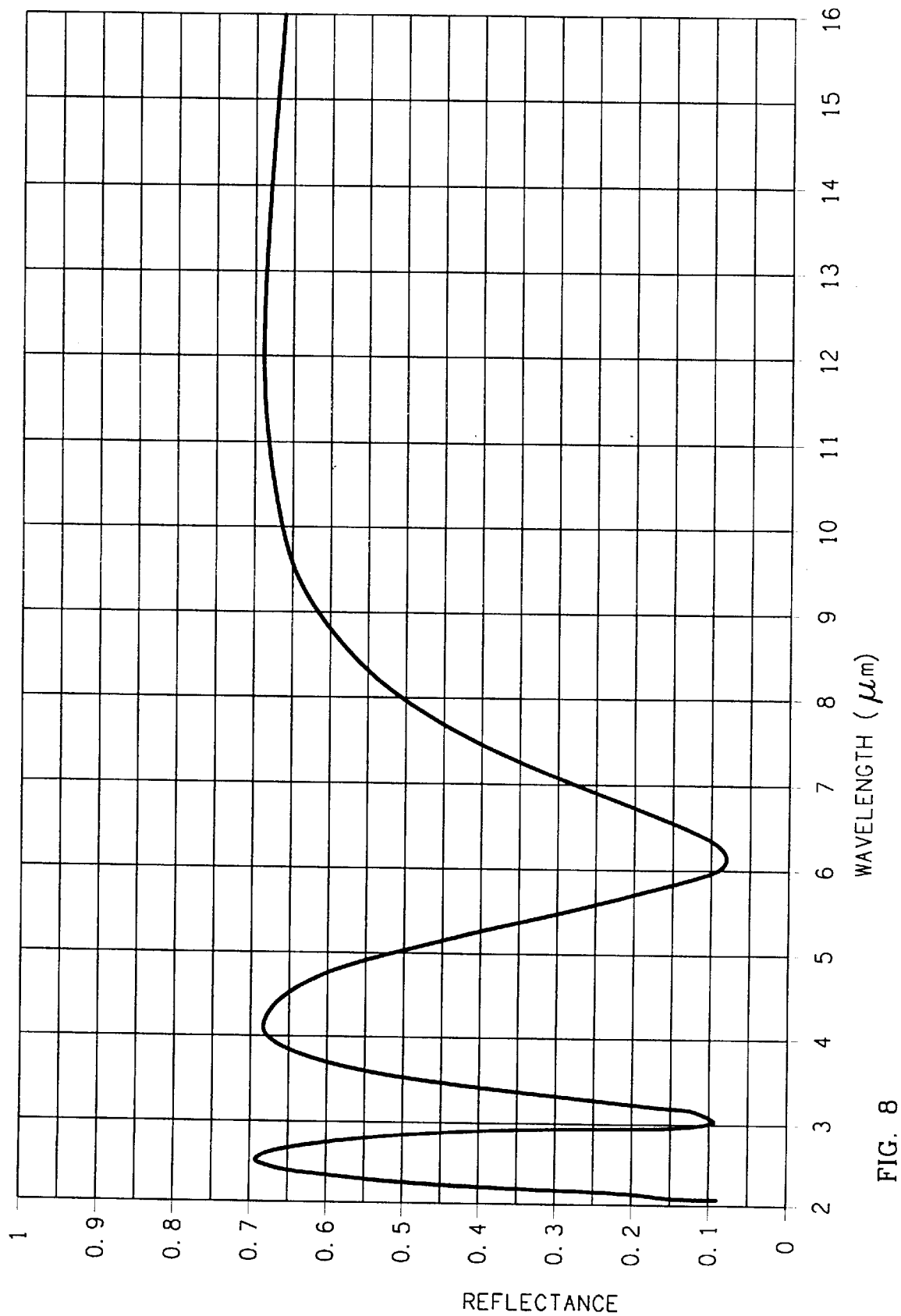
FIG. 8 is a graph similar to FIG. 1 plotting the infrared reflectance of a single layer coating on a dielectric substrate.

The reflectance curve in the infrared waveband for such a single layer stack is illustrated in FIG. 8. Except for the magnitude of the reflectance, the curve is very similar to the curve for a high-low-high three layer film. Thus, for lower reflectance requirements, the single layer coating of FIG. 7 will suffice, provided the thicknesses are chosen to create a harmonic peak at 3.5 to 5 microns, as explained in the foregoing text.

For film applications, the single layer coating is preferably sputter deposited onto a planar substrate, e.g., 3 mil thick PET, in the manner conventional in the art, as previously described; and for pigment particles, the single layer is preferably sputtered onto microsphere substrates in the manner described in conjunction with FIG. 5.

The objects and advantages of the invention have thus been shown to be attained in a convenient, economical and practical manner, both for the development of continuous supported signature control films, and supported and unsupported particulate pigments for coating compositions. In particular, the invention has established that materials heretofore deemed unusable for the formation of broad band infrared reflective and signature control materials can in fact be used to great advantage with thin film technology.

Therefore, while certain specific embodiments of the invention have been herein described in detail, it is to be appreciated that various changes, rearrangements and modifications may be made therein without departing from the scope of the invention as defined by the appended claims.

What is claimed is:

1. A method for producing a thin multilayer signature control element that is infrared reflective in the far infrared, that is comprised of alternating layers of materials of high refractive index and low refractive index, and that is capable of attaining a selected infrared reflectance performance with a minimal number of alternating layers, comprising the steps of (a) providing as the material of low refractive index a material having a coefficient of extinction of about $10^{-3}$ or greater and a refractive index in the order of about 1.5 or less, (b) providing said material of low refractive index in the form of a thin film that is of optical thickness but sufficiently thin that the film is substantially transmissive in the infrared spectrum, (c) providing as the material of high refractive index a material having a refractive index that is about 2.0 or more greater than the refractive index of the material of low refractive index, (d) depositing onto a substrate at respective optical thicknesses alternating layers of said material of high refractive index and said thin film of said material of low refractive index, and (e) forming alternating layers of said materials into a multilayer film that is infrared reflective in the far infrared and that provides in as few as 3 to 7 layers an infrared reflectance performance comparable to that of conventional optical filters comprised of 15 to 30 layers of materials having a refractive index differential less than 2.0.

2. A method as set forth in claim 1 wherein the material having a low index of refraction comprises a metal oxide deposited by one or the other of vapor deposition and sputter deposition.

3. A method as set forth in claim 1 wherein the material having a high index of refraction is deposited by one or the other of vapor deposition and sputter deposition and the material having a low index of refraction comprises a polymer deposited by thin film coating.

4. A method as set forth in claim 1 wherein the material having a high index of refraction is deposited by one or the other of vapor deposition and sputter deposition and the material having a low index of refraction comprises a monomer deposited and cured in vacuuo.

5. A method as set forth in claim 1 including the steps of
first, coating the substrate with a soluble release agent,
second, depositing the layers of the multilayer film onto the release coated substrate,
third, subjecting the coated substrate to a solvent for the release agent to release the multilayer film from the substrate, and
fourth, harvesting the released film.

6. A method as set forth in claim 1 including the steps of
defining on the substrate a plurality of recesses of preselected size and shape,
coating the substrate with a soluble release agent,
depositing the layers of the multilayer film into the recesses defined on the release coated substrate,
subjecting the coated substrate to a solvent for the release agent to release the multilayer film from the substrate, and
harvesting the multilayer film in the form of pigment particles of a size and shape corresponding substantially to the recesses defined on the substrate.

7. A method as set forth in claim 1 wherein each of the layers of the multilayer film is deposited on the substrate at an optical thickness substantially equal to one-fourth of the signature control wavelength.

8. A method as set forth in claim 1 wherein the layers of the multilayer film are deposited on the substrate at respective optical thicknesses effective to generate a main control peak at a primary waveband and at least one harmonic thereof at a selected secondary waveband.

9. A method as set forth in claim 1 wherein the layers of the multilayer film are deposited in sequence under vacuum.

10. A method as set forth in claim 9 wherein the material having a high index of refraction is deposited under vacuum by one or the other of vapor deposition and sputter deposition and the material having a low index of refraction is applied under vacuum as a polymerizable monomer or oligomer and then cured under vacuum to polymer form.

11. A method as set forth in claim 1 wherein the layers of the multilayer film are deposited at respective optical thicknesses effective to generate a main control peak at a selected primary waveband and at least one harmonic thereof at a selected secondary waveband including the steps of adjusting the thickness of the material having a high index of refraction to position the harmonic and adjusting the thickness of the material having a low index of refraction to compensate for the thickness adjustments of the material having a high index of refraction.

12. A method as set forth in claim 1, wherein the material having a low index of refraction is selected from polyesters, acrylics, acrylates, styrenes, polyurethanes and vinyl esters applied in sufficiently thin form to be substantially transmissive in the infrared spectrum.

13. A method as set forth in claim 1 wherein the substrate comprises one or more dielectric spheres.

14. A method as set forth in claim 13 including the step of levitating a plurality of dielectric spheres in a coating chamber and depositing at least one of said materials onto the levitated spheres.

15. A method for producing a thin multilayer signature control element that is infrared reflective in the far infrared and comprised of a minimum number of alternating layers of materials of high refractive index and low refractive index for attaining a selected level of infrared reflectance, comprising the steps of enhancing the differential between the indices of refraction of the materials of high and low refractive index by
(a) providing as the material of high refractive index a material having a refractive index in the order of about 3.4 or greater,
(b) providing as the material of low refractive index a material having a coefficient of extinction of about $10^{-3}$ or greater and a refractive index in the order of about 1.5 or less and providing a differential between the indices of refraction of the high and low index materials that is about 2.0 or greater, and
(c) providing the material of low refractive index in the form of a thin film that is of optical thickness but sufficiently thin that the film is substantially transmissive in the infrared spectrum, depositing onto a substrate at respective optical thicknesses alternating layers of said material of high refractive index and said thin film of said material of low refractive index, and forming alternating layers of said materials into a multilayer signature control element that is infrared reflective in the far infrared and that provides in as few as 3 to 7 layers a reflectance performance comparable to that of a multilayer film comprised of 15 to 30 alternating layers of materials having a differential between their indices of refraction of less than 2.0.

16. A method for decreasing the number of alternating thin film layers of materials of high refractive index and low refractive index required in a multilayer signature control device in order to achieve infrared reflectance in the far infrared, comprising the steps of enhancing the differential between the indices of refraction of the materials of high refractive index and low refractive index by (a) providing as the material of low refractive index a material having a coefficient of extinction of about $10^{-3}$ or greater and a refractive index in the order of about 1.5 or less, (b) providing the material of low refractive index in the form of a thin film that is of optical thickness but sufficiently thin that the film is substantially transmissive in the infrared spectrum, and (c) providing as the material of high refractive index a material having a refractive index that is about 2.0 or more greater than the refractive index of the material of low refractive index, applying to a substrate at respective optical thicknesses alternating layers of said material of high refractive index and said thin film of said material of low refractive index, and forming alternating layers of said materials into a multilayer signature control element that is infrared reflective in the far infrared and that is capable of attaining in as few as 3 to 7 layers a reflectance performance comparable to that of a multilayer signature control device comprised of 15 to 30 alternating layers of materials having a differential between their indices of refraction less than 2.0.

17. A method for producing an infrared reflective signature control element comprising the steps of providing a plurality of spheres of dielectric material having an index of refraction in the order of about 1.5 or less, providing a coating material having an index of refraction that is about 2.0 or more greater than the index of refraction of said spheres, and coating said spheres with a layer of said coating material.

18. A method as set forth in claim 17 including the steps of providing a second coating material having an index of refraction of about 1.5 or less, and applying a layer of the second coating material to said layer of the first coating material.

19. A method as set forth in claim 18 including the step of applying to said spheres alternating layers of the first coating material and the second coating material.

20. A method as set forth in claim 17, wherein said spheres are levitated in a coating chamber and the coating material is applied to the levitated spheres.

21. A method of producing and harvesting multilayer films comprising the steps of coating a substrate with a soluble release agent comprised of soap, polyvinyl alcohol, polystyrene, or mixtures thereof, depositing alternating layers of a multilayer film onto the release coated substrate, applying solvent for the release agent to the coated substrate to dissolve the release agent and release the multilayer film from the substrate, and harvesting the released film.

22. A method as set forth in claim 21 including the step of reducing the multilayer film to particles of predetermined size.

23. A method as set forth in claim 21 including the step of reducing the multilayer film to particles of sizes with a range of from about 5 to about 500 microns.

24. A method as set forth in claim 21 including the step of reducing the multilayer film to particles of predetermined size by subjecting the same to shear.

25. A method of producing and harvesting multilayer films in particulate form comprising the steps of defining on a substrate a plurality of recesses of preselected size and shape, coating the substrate and the recesses therein with a soluble release agent, depositing alternating layers of a multilayer film into the recesses defined on the release coated substrate, applying solvent for the release agent to the coated substrate to dissolve the release agent and release the multilayer film from the substrate, and harvesting the multilayer film in the form of pigment particles of a size and shape corresponding substantially to the recesses defined on the substrate.

* * * * *